United States Patent [19]

Suzuki et al.

[11] Patent Number: 4,723,520
[45] Date of Patent: Feb. 9, 1988

[54] IGNITION TIMING CONTROL METHOD FOR INTERNAL COMBUSTION ENGINES

[75] Inventors: Yoshio Suzuki, Wakoh; Shigehiro Kimura, Niiza, both of Japan

[73] Assignee: Honda Giken Kogyo Kabushiki Kaisha, Tokyo, Japan

[21] Appl. No.: 865,536

[22] Filed: May 21, 1986

[30] Foreign Application Priority Data

May 30, 1985 [JP] Japan ................... 60-115266

[51] Int. Cl.⁴ .................................. F02P 5/00
[52] U.S. Cl. ...................... 123/416; 123/417; 123/414; 123/406
[58] Field of Search ............ 123/416, 414, 417, 406

[56] References Cited

U.S. PATENT DOCUMENTS

| | | | |
|---|---|---|---|
| 4,503,830 | 3/1985 | Nakamura et al. | 123/417 |
| 4,508,075 | 4/1985 | Takao et al. | 123/417 |
| 4,558,417 | 12/1985 | Akiyama et al. | 123/417 |
| 4,562,612 | 1/1986 | Chauvel | 123/417 |
| 4,584,978 | 4/1986 | Sasaki et al. | 123/416 |
| 4,638,780 | 1/1987 | Trinn et al. | 123/417 |
| 4,640,249 | 2/1987 | Kawamura et al. | 123/417 |
| 4,644,917 | 2/1987 | Yakawa et al. | 123/417 |

Primary Examiner—Raymond A. Nelli
Attorney, Agent, or Firm—Lyon & Lyon

[57] ABSTRACT

A desired value of ignition timing and a correction value therefor are calculated at a timing corresponding to a first specific one of sensed predetermined crank angle positions of each cylinder of the engine. Data indicative of the calculated desired value of ignition timing are set in a counter to start counting based upon the set data at a second specific one of the predetermined crank angle positions, subsequent to the first specific one, so that the ignition takes place upon completion of the counting. When it is determined from the calculated desired value of ignition timing whether the ignition is to be effected after a third specific one of the predetermined crank angle positions, subsequent to the second specific one, the data set in the counter is updated to the calculated correction value, at the third specific one of the predetermined crank angle positions.

2 Claims, 5 Drawing Figures

IGNITION TIMING CONTROL METHOD FOR INTERNAL COMBUSTION ENGINES

BACKGROUND OF THE INVENTION

This invention relates to an ignition timing control method for internal combustion engines.

A known method of controlling the ignition timing of an internal combustion engine, such as disclosed in Japanese Provisional Patent Publication (Kokai) No. 54-43649, includes calculating ignition timing in dependence upon the operating parameters of the engine and determining the ignition timing by driving a counter from a predetermined crank angle position on the basis of the calculated results. A problem encountered with this conventional method is that if the counter takes too long to count the clock pulses applied thereto up or down, a sudden change in the rotational speed of the engine can no longer be followed up, thus making it impossible to achieve precise control of ignition timing. In other words, the longer the counting time, the higher the probability that fluctuations take place in the engine rotational speed from the time the counting starts to the time it ends, thus resulting in degraded accuracy of the ignition timing control.

Another ignition timing control method for an internal combustion engine described, for example, in Japanese Provisional Patent Publication (Kokai) No. 56-92353, includes calculating ignition timing and simultaneously checking the status of a counter whenever a signal indicative of engine revolution, such as a signal indicative of crank angle position, is generated, resetting the status of the counter whenever the value of the count remaining therein exceeds a certain value, and causing the counter to perform the counting operation anew. The disadvantage with this method wherein ignition timing is being calculated each time the engine revolution signal is generated is that these calculations do not allow calculations for other control operations to be executed.

SUMMARY OF THE INVENTION

It is therefore an object of the invention to provide an ignition timing control method for an internal combustion engine, which method makes it possible to follow up even sudden changes in the rotational speed of the engine as may accompany rapid acceleration or deceleration.

It is a further object of the invention to enable execution of calculations for other control operations than calculation of ignition timing, without being impeded by the latter.

According to the present invention, the foregoing object is attained by providing an ignition timing control method for an internal combustion engine including sensing a predetermined reference crank angle position of each of cylinders of the engine to generate a first control signal indicative of the sensed predetermined reference crank angle position, sensing a plurality of predetermined crank angle positions intervening between the predetermined reference crank angle position of each of the cylinders and the predetermined reference crank angle position of the next cylinder to generate a second control signal indicative of the sensed predetermined crank angle positions, calculating a desired value of ignition timing at a timing corresponding to a first specific one of the sensed predetermined crank angle positions of which the second control signal is indicative, setting data indicative of the calculated desired value of ignition timing in counter means to start counting based upon the set data at a second specific one of the predetermined crank angle positions, which is subsequent to the first specific one of the predetermined crank angle positions, and effecting ignition of the mixture when the counting is completed.

The method according to the invention is characterized by comprising the following steps:

(1) calculating a correction value for the desired value of ignition timing as well as the latter at the timing corresponding to the first specific one of the sensed predetermined crank angle positions;

(2) determining from the calculated desired value of ignition timing whether the ignition is to be effected after a third specific one of the predetermined crank angle positions which is subsequent to the second specific one of the predetermined crank angle positions; and (3) when it is determined that the ignition is to be effected after the third specific one of the predetermined crank angle positions, updating the data indicative of the calculated desired value of ignition timing set in the counting means to the correction value calculated in the step (1), at the third specific one of the predetermined crank angle positions.

Preferbly, the method includes sensing the rotational speed of the engine at a fourth specific one of the predetermined crank angle positions, which is preceding to the first specific one of the predetermined crank angle positions, and wherein the desired value of ignition timing and the correction value are calculated based upon the sensed rotational speed of the engine.

Thus, it is possible to follow up even sudden changes in the rotational speed of the engine so that ignition timing can be controlled with greater precision to improve engine driveability. Moreover, since other calculations are not prevented from being executed by frequent calculation of ignition timing, many other calculations can be accurately performed to control a variety of other operations or other devices.

The above and other objects, features and advantages of the invention will be apparent from the following description taken in conjunction with the accompanying drawings, in which like reference characters designate the same or similar elements or parts throughout the figures thereof.

DETAILED DESCRIPTION

A preferred embodiment of an ignition timing control method for an internal combustion engine according to the invention will now be described with reference to FIGS. 1 through 4.

Figure 1:
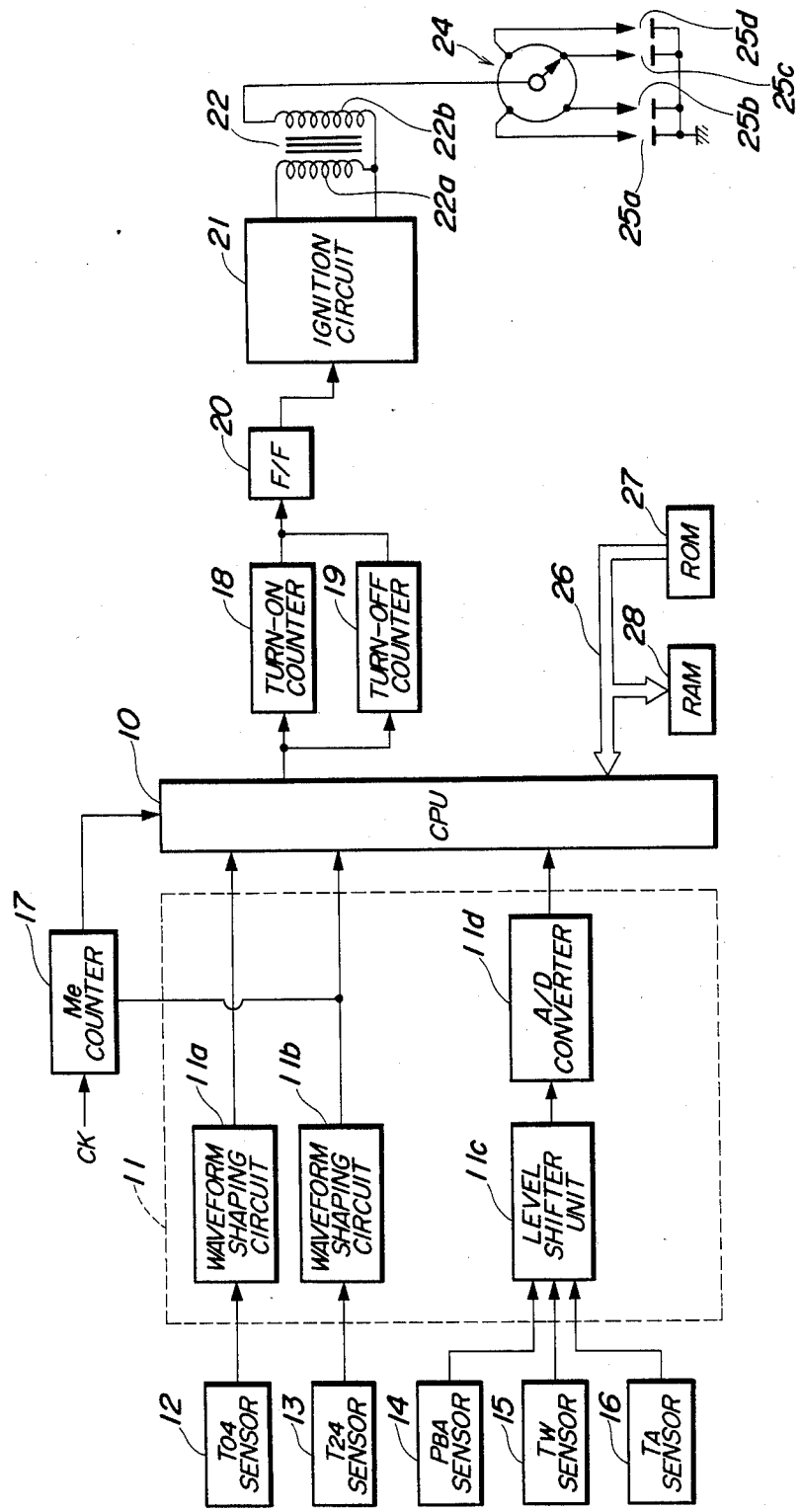
FIG. 1 is a block diagram illustrating the overall construction of an ignition timing control system for an internal combustion engine to which the method of the present invention is applied.

FIG. 1 illustrates the overall construction of an ignition timing control system to which the present invention is applied. The illustrated ignition timing control system is for controlling the ignition timing of a four-cylinder internal combustion engine, and includes a central processing unit (hereafter referred to as "CPU") 10 having an input side to which sensors for sensing various parameters are connected via an input circuit 11. These sensors include a T04 sensor 12 arranged in facing relation, for example, to an engine camshaft, not shown, for generating a T04 signal pulse indicative of a reference crank angle position of each engine cylinder immediately before the top dead center (TDC) position at the end of the compression stroke of each cylinder and at a predetermined crank angle position of, for example, 10° before TDC (hereafter referred to as "BTDC"). The T04 sensor 12 is connected to the CPU 10 through a waveform shaping circuit 11a in the input circuit 11. The waveform shaping circuit 11a receives T04 signal pulses from the T04 sensor 12 and shapes the pulses into rectangular pulses, shown in (a) of FIG. 2, which are applied to the CPU 10.

Figure 2:
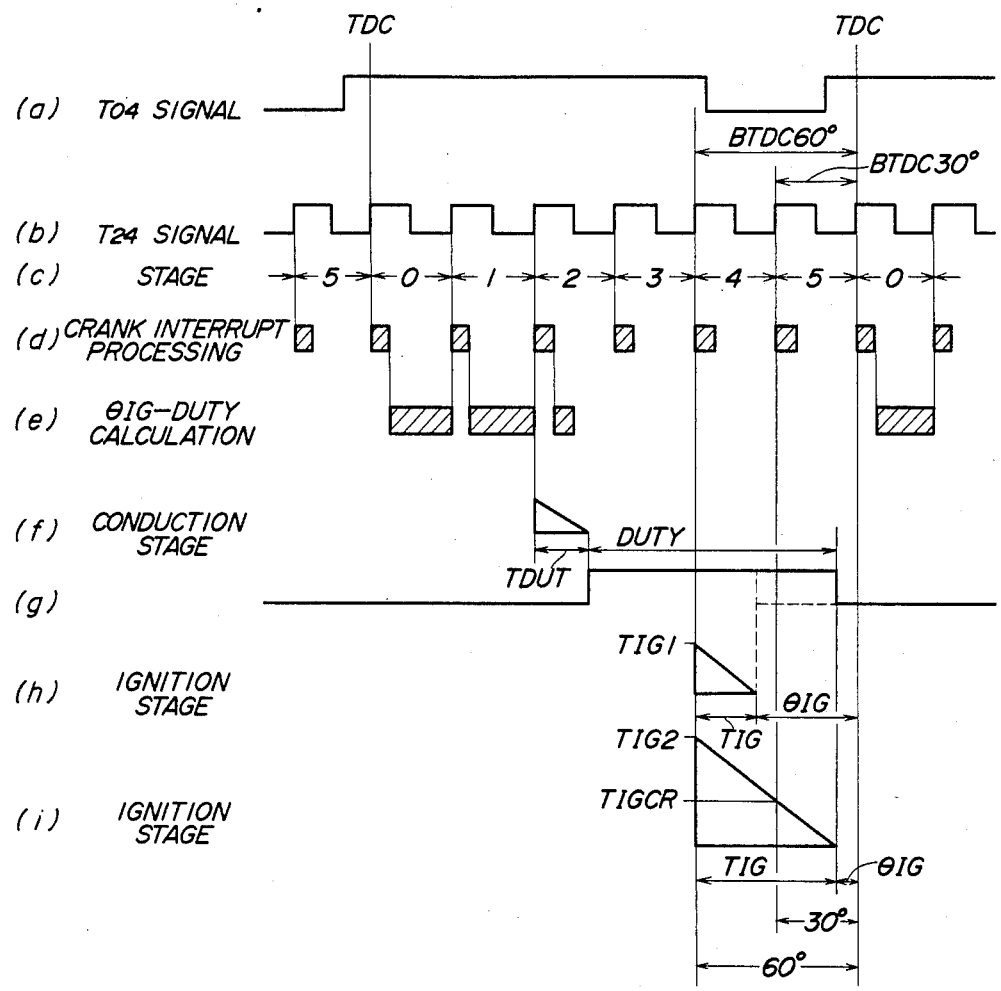
FIG. 2 is a timing chart of signal waveforms illustrating the operation of the system shown in FIG. 1.

A T24 sensor 13 which, like the T04 sensor 12, is arranged in facing relation of the camshaft, is adapted to generate 24 equally spaced pulses (i.e., pulses produced at a 30° interval in terms of the crank angle) at predetermined crank angle positions during one full revolution of the camshaft, namely two full revolutions of the crankshaft, which is not shown. The T24 sensor 13 is connected to the CPU 10 via a waveform shaping circuit 11b, whereby the T24 signal pulses, shown in (b) of FIG. 2, are shaped before being applied to the CPU 10.

The remaining sensors include an absolute pressure (PBA) sensor 14 for sensing absolute pressure PBA in an intake pipe downstream of the engine throttle valve, neither of which are shown, an engine coolant temperature (TW) sensor 15 mounted in the peripheral wall of a cylinder filled with engine cooling water or coolant for sensing the coolant temperature TW, and an intake air temperature (TA) sensor 16 for sensing intake air temperature TA in the intake pipe. These sensors 14, 15, 16 are connected to the CPU 10 via a level shifter unit 11c and an A/D converter 11d of the input circuit 11. The absolute pressure sensor 14, engine coolant temperature sensor 15 and intake air temperature sensor 16 produce analog output signals each of which is shifted to a predetermined voltage level by the level shifter unit 11c. Each analog signal so shifted is then converted into a digital signal by the A/D converter 11d before being fed into the CPU 10.

An Me counter 17 counting the pulses in a clock signal CK receives the crank angle position signal T24 from the waveform shaping circuit 11b and has its output side connected to the CPU 10. The Me counter 17 is reset whenever a T24 signal pulse is applied thereto and thus measures the time interval at which the T24 signal pulses are generated. The value of the count so recorded is read in by the CPU 10, which proceeds to use this value to compute a parameter value Me proportional to the reciprocal of the rpm of the engine. The value of Me, which serves as information indicative of the rotational speed Ne, is used as a parameter in the calculation of ignition timing.

Connected to the output side of the CPU 10 in a parallel configuration are a turn-on counter 18 and a turn-off counter 19. The outputs from both of these counters 18, 19 are connected to a flip-flop circuit 20, whose output is applied to an ignition circuit 21. The output of the latter is connected to the primary winding 22a of an ignition coil 22, the secondary coil 22b of which is connected to spark plugs 25a–25d of respective engine cylinders via a distributor 24. The turn-on and turn-off counters 18, 19 are both down counters. As will be described in detail below, conduction timing data calculated by the CPU 10 are set in the turn-on counter 18, which is provided with clock pulses for counting down these data in a range of crank angle positions within which conduction of the primary coil is to start (which range shall hereafter be referred to simply as a "conduction stage"), with the downcount starting from the beginning of the particular stage. This is to regulate the conduction iniatiating timing of the primary coil 22a of the ingition circuit 21.

Likewise, ignition timing data calculated by the CPU 10 are set in the turn-off counter 19, which is provided with clock pulses for counting down these data in a predetermined "ignition stage" from the beginning of this stage. This is to decide the timing at which conduction of the primary coil 22a is to be terminated, whereby the secondary coil 22b is made to generate a high voltage pulse for firing one of the spark plugs. Thus, the turn-on counter 18 and turn-off counter 19 in cooperation decide the turn-on timing and turn-off timing of the primary coil 22a in ignition circuit 21.

Also connected to the CPU 10 via a bus 26 are a ROM 27 storing an operational program, etc., and a RAM 28 for temporarily storing the results of calculations executed by the CPU 10 in accordance with the operational program, as well as other data.

Figure 3:
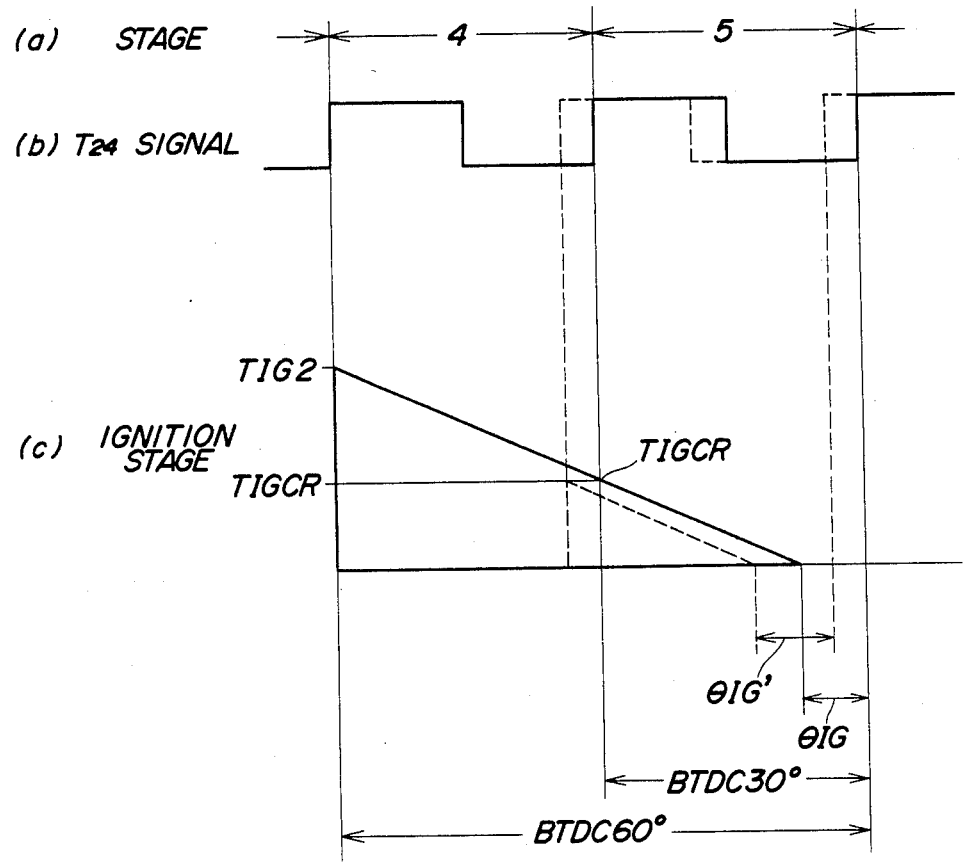
FIG. 3 is a timing chart illustrating the updating of ignition timing control data according to the present inevntion.

Reference is now made to FIGS. 2 and 3 to describe the operation of the ignition timing control system constructed as above.

The timing signals from the sensors 12 and 13, namely the TDC signal T04 [(a) in FIG. 2] and crank angle position signal T24 [(b) in FIG. 2], respectively, are fed into the CPU 10 after first being shaped respectively by the waveform shaping circuits 11a, 11b. The stages shown in FIGS. 2 and 3 refer to the time interval or spacing between the leading edge of each pulse of the crank angle position signal T24 and the leading edge of the next pulse of the signal T24. These stages are numbered consecutively from 0 to 5 starting from the first stage [(c) in FIG. 2]. The CPU 10 executes two programs as programs for controlling ignition timing. One is a crank interrupt processing program [(d) in FIG. 2] executed whenever a pulse in a T24 signal is generated, and the other is a $\theta$IG-DUTY processing program [(e) in FIG. 2] executed following the end of the crank interrupt processing program executed in stage 0. When a T24 signal pulse is input to the CPU 10 during execution of the $\theta$IG-DUTY processing, execution of crank interrupt processing takes precedence.

Crank interrupt processing entails executing, based on the TDC signal T04 and crank angle position signal T24, such control operations as determining a conduction stage (stage 2 in the embodiment of FIG. 2) at which the turn-on counter 18 is to start counting as well as a predetermined stage (stage 4 in the embodiment of FIG. 2) at which the turn-off counter 19 is to start, detection of the time interval, denoted by ME6$i$, at which the T24 signal pulses are generated, and the starting of the turn-on and turn-off counters 18, 19, respectively.

$\theta$IG-DUTY processing, on the other hand, involves computing such data as an advance angle control value $\theta$IG, a conduction control value DUTY (the ratio of coil conduction time to the T04 signal pulse generation time interval), which is shown in (g) of FIG. 2, conduction timing TDUT [(f) of FIG. 2] and ignition timing TIG [(h) or (i) of FIG. 2].

The processing for each item of the above data will now be described in detail. The CPU 10 calculates the advance angle control value $\theta$IG from such values as the rotational speed Ne of the engine, absolute pressure PBA in the intake pipe and engine coolant temperature TW by using the following equation $$\theta IG = \theta MAP + \theta IGCR \tag{1}$$

In Equation (1), $\theta$MAP represents a basic advance angle value read out of a map, which is stored in the ROM 27, from a location decided by the rotational speed Ne and intake pipe absolute pressure PBA. $\theta$IGCR represents a variable for correcting the basic advance angle value. $\theta$IGCR is read out of a table, stored in the ROM 27, from a location determined by the engine coolant temperature TW, intake air temperature TA, atmospheric pressure PA, etc.

The rotational speed (engine rpm) Ne used in calculating the value of $\theta$MAP is provided by the Me counter 17. The value Me employs a sum Me (=ME60+ME61+ME62+ME63+ME64+ME65) of values ME60-—ME65 obtained by measuring the time intervals of respective stages 0–5 of the crank angle position signal T24 shown in (b) of FIG. 3 using clock pulses (fixed clock pulses) CK having a constant period.

The conduction control value DUTY is a function of the rotational speed Ne and is read out of a table stored in the ROM 27 in a manner similar to that mentioned above. The value read out of the table is corrected by the battery voltage to be supplied to the ignition coil, before being applied for use.

Ignition is effected within a range of from 0° to 60° BTDC, namely in stage 4 or 5. More specifically, when the data applied to the turn-off counter 19 is counted down to zero by this counter, which starts the downcount operation from the leading edge of stage 4, the current being fed into the primary coil 22a of ignition circuit 21 is cut off. Assume that the input value applied to the turn-off counter 19 is TIG. This is a value obtained by an angle-to-time conversion and is determined from the advance angle control value $\theta$IG and Me value obtained as described above. In addition, the conduction start timing TDUT is a value similarly obtained by an angle-to-time conversion and is determined by the advance angle control value $\theta$IG, conduction control value DUTY and the value of Me. Thus, the values TIG and TDUT can each be set to any position within a stage.

When an instant at which a particular stage starts (stage 2 in FIG. 2) in which conduction of the ignition coil is to start, the turn-on counter 18 starts counting down from a value corresponding to the value TDUT. Then, when the counted value in the counter 18 becomes 0, i.e. the set conduction starting time is reached, the flip-flop 20 is set to start conduction of the primary winding in the ignition circuit 21. As mentioned above, when the ignition timing TIG is attained in stage 4, the flip-flop 20 is reset by the output of the turn-off counter 19.

By being reset, the flip-flop circuit 20 provides the ignition circuit 21 with a signal for terminating conduction of the primary coil 22a. At the instant the flow of current through the primary coil 22a is thus halted, the secondary coil 22b generates the high voltage for ignition to fire a corresponding one of the spark plugs 25a–25d at the regulated advance angle position. The ignition timing TIG is calculated in a stage prior to the ignition stage, e.g. stage 3. Ignition takes place in stage 4 [(h) of FIG. 2] when the advance angle control value $\theta$IG lies within a range of 60°–30° BTDC, and in stage 5 [(i) of FIG. 2] when $\theta$IG lies within a range of 30°–0° BTDC.

When the ignition timing TIG falls in stage 4, the turn-off counter 19 performs the downcount in a short period of time and no particular problem is encountered in controlling ignition even if the rotational speed of the engine undergoes a sudden change. In a case where the ignition timing TIG extends from stage 4 into stage 5, however, the turn-off counter 19 takes too long to perform the downcount and, hence, if there is a sudden change in the rotational speed of the engine during this prolonged downcount period, the control of ignition timing TIG is incapable of following the change.

Therefore, according to the invention, when the advance angle control value $\theta$IG lies within the range 30°–0° BTDC, ignition timing data TIG set at the beginning of stage 4 and an ignition timing correction value TIGCR at the beginning of stage 5 are calculated beforehand, e.g. in stage 3, and the status of the turn-off counter 19 is updated to the correction value TIGCR at the beginning of stage 5. Accordingly, if engine rotation changes suddenly during the downcount performed by the turn-off counter 19 so that there is an accompanying decrease in the interval at which the T24 signal pulses are generated, as shown in broken lines in FIGS. 3(b) and (c), the updating of the status of the turn-off counter 19 to the correction value TIGCR at the beginning of stage 5 makes it possible to reduce the error in the prevailing advance angle control value $\theta$IG' with respect to the advance angle control value $\theta$IG which is obtained when no such engine rotation change takes place. In other words, the ignition timing can be varied to follow the sudden change in the rotational speed of the engine.

Figure 4A:
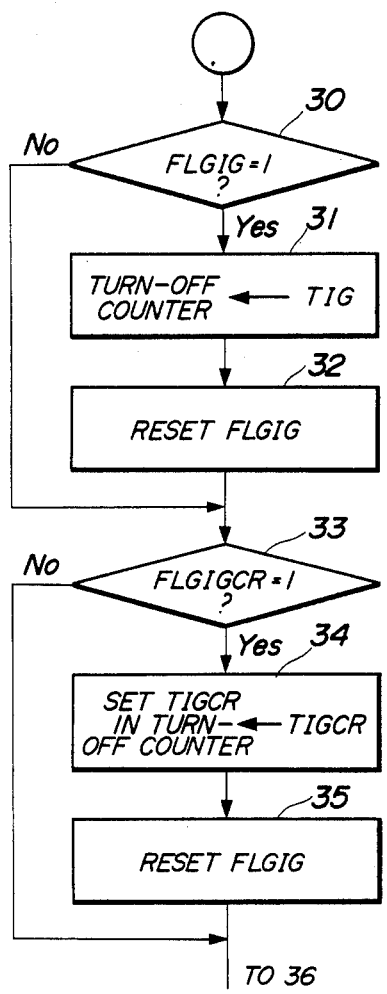
FIGS. 4A and 4B, represent a flowchart illustrating a manner of controlling ignition timing according to the present invention.
Figure 4:
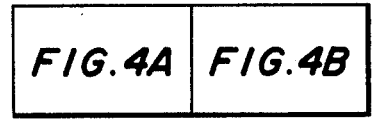
FIG. 4 comprising
Figure 4B:
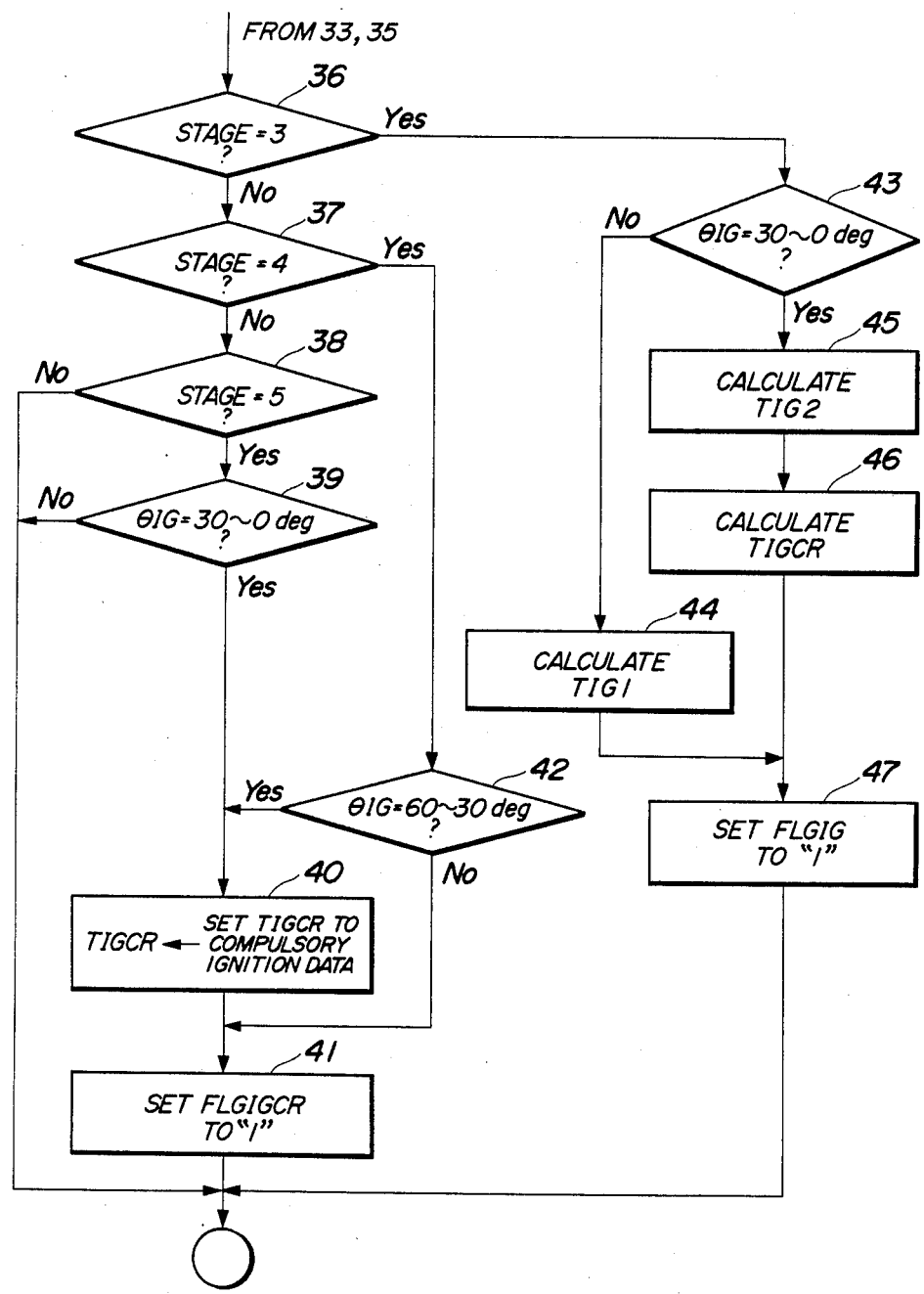

FIG. 4 is a flowchart of a procedure executed internally by the CPU 10 for controlling ignition timing according to the present invention. This program is executed in the crank interrupt processing of FIG. 2 executed each time a T24 signal pulse is input.

The first step of the flowchart is a step 30, at which the CPU 10 makes a determination as to whether or not a flag FLGIG, is logical "1" which represents the fact that calculation of the ignition timing TIG has been executed. If the answer is NO, the program proceeds to a step 33, at which it is determined whether a flag FLGIGCR, which represents the fact that correction of ignition timing is to be effected, is logical "1". If the answer is NO, the program proceeds to a step 36, at which the CPU 10 determines whether the prevailing stage is stage 3. If the decision is negative, the next step executed is a step 37, at which it is determined whether the prevailing stage is stage 4. If it is not, the program proceeds to a step 38, where the CPU 10 determines whether the prevailing stage is stage 5. If the decision rendered here is negative, the CPU 10 ends the present program. Thus, no corrective processing is executed in stages 0 through 2.

When the decision rendered at the step 36 is affirmative, namely when the prevailing stage is stage 3, the program proceeds to a step 43, at which the CPU 10 determines whether the advance angle control value θIG lies within the range 30°–0° BTDC. If the answer at the step 43 is NO, namely if the advance angle control value θIG lies within the range 60°–30° BTDC, then an ignition timing TIG1 [(h) of FIG. 2] is calculated at a step 44. This is followed by a step 47, at which the flag FLGIG is set to "1" to indicate that calculation of the ignition timing has been executed. The present program is then ended. Note that the calculation of the ignition timing TIG1 at the step 44 is performed based on the data indicative of the rotational speed Ne of the engine calculated in stage 2 in which the value Ne is presumed to be close to that in stage 4 in which the ignition is to take place.

If a YES answer is obtained at the step 43, the program proceeds to a step 45, at which the CPU 10 calculates an advance ignition timing TIG2 [(i) of FIG. 2], and then to a step 46, at which the CPU 10 calculates the correction value TIGCR [(i) of FIG. 2]. The values TIG2 and TIGCR are calculated based on data indicative of the rotational speed Ne calculated in stage 0, since stage 0 and stage 5 are close to each other in the phase of fluctuation cycle of the engine rotational speed Ne, and accordingly are presumably also close to each other in the value Ne. Next, at the step 47, the aforementioned flag FLGIG is set to "1" and the present program is ended. Thus, the ignition timing TIG1, or the ignition timing TIG2 and the correction value TIGCR, is calculated in stage 3. The calculated data are stored temporarily in the RAM 28.

If it is determined at the step 30 that the flag FLGIG is logical "1" at the beginning of stage 4, namely at the arrival in stage 4, then the program proceeds to a step 31, which calls for the ignition timing TIG1 to be set in the turn-off counter 19, providing that TIG1 has been calculated at the step 44. The flag FLGIG is then zet to logical "0" at a step 32, followed by the step 33 calling for the determination as to whether the flag FLGIGCR is logical "1". Since the flag FLGIGCR has not yet been set and therefore is "0", the answer obtained at the step 33 is NO, so that the program proceeds to the step 37 via the step 36. The step 37 calls for the CPU 10 to determine whether the prevailing stage is stage 4. Since the prevailing stage is stage 4 at this time, a YES decision is rendered at the step 37 and the program proceeds to a step 42, at which it is determined whether the advance angle control value θIG lies within the range 60°–30° BTDC. Since θIG does lie within this range, a YES answer is obtained and the program proceeds to a step 40.

The step 40 calls for the CPU 10 to set the correction value TIGCR to a value of compulsory ignition data, after which the CPU 10 sets the correction flag FLGIGCR to logical "1" at a step 41 and ends the present program.

Next, at the beginning of stage 5, the program proceeds from the step 30 to the step 33, at which it is determined that the flag FLGIGCR is "1", and thence to a step 34. Here the compulsory ignition data value is set in the turn-off counter 19 as the correction value TIGCR. This is followed by a step 35, at which the flag FLGIGCR is reset to "0", after which the program proceeds to the step 38 via the steps 36, 37. It is determined at the step 38 that the prevailing stage is stage 5, so that a YES answer is obtained. This is followed by a step 39, at which it is determined whether the advance angle correction value θIG lies within the range 30°–0° BTDC. Since θIG lies within the range 60°–30° BTDC, a NO answer is obtained at the step 39 and the present program is ended.

If a YES decision is rendered at the step 43 so that the ignition timing TIG2 and correction value TIGCR are calculated at the steps 45, 46, respectively, then a YES answer is obtained at the step 30 at the beginning of stage 4, the data indicative of the ignition timing TIG2 are set in the turn-off counter 19 at the step 31, the flag FLGIG is reset at the step 32 and it is determined whether the flag FLGIGCR is "1" at the step 33. Since the flag FLGIGCR is still "0" in stage 4, a negative decision is rendered at the step 33 and the program proceeds to the step 37 via the step 36.

Since the answer obtained at the step 37 is YES, it is determined at the step 42 whether the advance angle control value θIG lies within the range 60°–30° BTDC. θIG at this time lies within the range 30°–0° BTDC, so that the answer obtained at the step 42 is NO. The program therefore proceeds to the step 41, where the CPU 10 sets the flag FLGIGCR to "1" and ends the present program.

Next, at the beginning of stage 5, a NO answer is obtained at the step 30 and the program proceeds to the step 33, where it is determined whether the flag FLGIGCR is "1". Since the flag FLGIGCR has been set to "1" in stage 4 before stage 5 is reached, the decision rendered at the step 33 is affirmative and the correction value TIGCR calculated at the step 46 is set in the turn-off counter 19 at the step 34. The status of the turn-off counter 19 is thus updated. Next, at the step 35, the flag FLGIGCR is reset to logical "0" and the program proceeds to the step 38 via the steps 36, 37. Whether the prevailing stage is stage 5 is determined at the step 38. Since stage 5 is the currently prevailing stage, the answer is YES at step 38 and it is determined at the step 39 whether the advance angle control value θIG lies within the range 30°–0° BTDC. Since θIG does lie within this range at this time, the answer obtained at the step 39 is YES. The program proceeds to the step 40, where the compulsory ignition data is set as the correction value TIGCR, and then to the step 41, at which the CPU 10 sets the flag FLGIGCR to "1" and ends the present program.

Thus, when the advance angle control value θIG lies within the range 30°–0° BTDC, the status of the turn-off counter 19 is updated to the correction value TIGCR at the beginning of stage 5.

When ignition is not effected within the range of stage 4 or 5 depending upon the data indicative of the ignition timing TIG1 or TIG2 and the correction value TIGCR, ignition is compelled to take place at the beginning of the respective next stage in accordance with the compulsory ignition data.

As set forth above, according to the invention, the ignition timing data set in the turn-off counter 19 is updated to the correction value TIGCR at the beginning of stage 5, the correction value TIGCR being calculated in stage 4, thus making it possible to immediately follow up sudden changes in the engine rotational speed, and thereby contributing to improvement of the driveability of the engine. Furthermore, since the ignition timing data is not calculated in every stage in synchronism with T24 signal pulses as the crank interrupt signal, calculations for control of other devices can be made in synchronism with T24 signal pulses, resulting in accurate control of the other devices.

As many apparently widely different embodiments of the present invention can be made without departing from the spirit and scope thereof, it is to be understood that the invention is not limited to the specific embodiments thereof.

What is claimed is:

1. In a method of controlling the timing of ignition of a mixture in an internal combustion engine, including sensing a predetermined reference crank angle position of each of the cylinders of the engine to generate a first control signal indicative of the sensed predetermined reference crank angle position, sensing a plurality of predetermined crank angle positions intervening between said predetermined reference crank angle position of each of the cylinders and said predetermined reference crank angle position of the next cylinder to generate a second control signal indicative of the sensed predetermined crank angle positions, calculating a desired value of ignition timing at a timing corresponding to a first specific one of the sensed predetermined crank angle positions of which said second control signal is indicative, setting data indicative of the calculated desired value of ignition timing in counter means to start counting based upon the set data at a second specific one of said predetermined crank angle positions, which is subsequent to said first specific one of said predetermined crank angle positions, and effecting ignition of the mixture when the counting is completed, the improvement comprising the following steps:

(1) calculating a correction value for said desired value of ignition timing as well as said desired value of ignition timing at said timing corresponding to said first specific one of the sensed predetermined crank angle positions;

(2) determining from the calculated desired value of ignition timing whether the ignition is to be effected after a third specific one of the predetermined crank angle positions which is subsequent to said specific one of said predetermined crank angle positions; and (3) when it is determined that the ignition is to be effected after said third specific one of the predetermined crank angle positions, updating the data indicative of the calculated desired value of ignition timing set in the counting means to said correction value calculated in said step (1), at said third specific one of said predetermined crank angle positions.

2. A method as claimed in claim 1, including sensing rotational speed of the engine at a fourth specific one of said predetermined crank angle positions, which is preceeding to said first specific one of said predetermined crank angle positions, and wherein said desired value of ignition timing and said correction value are calculated based upon the sensed rotational speed of the engine.

* * * * *

UNITED STATES PATENT AND TRADEMARK OFFICE
CERTIFICATE OF CORRECTION

PATENT NO. : 4,723,520
DATED : February 9, 1988
INVENTOR(S) : YOSHIO SUZUKI and SHIGEHIRO KIMURA It is certified that error appears in the above—identified patent and that said Letters Patent is hereby corrected as shown below:

Column 10, line 10, after "said" insert -- second --. (1st occurr)

Signed and Sealed this

Fourth Day of September, 1990

Attest:

HARRY F. MANBECK, JR.

*Attesting Officer*   *Commissioner of Patents and Trademarks*